US010767929B2

(12) United States Patent
Kajitani et al.

(10) Patent No.: US 10,767,929 B2
(45) Date of Patent: Sep. 8, 2020

(54) FURNACE

(71) Applicants: Tsuyoshi Kajitani, Kyotanabe-shi (JP); NIPPON CRUCIBLE CO., LTD., Tokyo (JP)

(72) Inventors: Tsuyoshi Kajitani, Kyotanabe (JP); Kazumi Yoshiguchi, Bangkok (TH)

(73) Assignees: Tsuyoshi Kajitani, Kyotanabe-shi (JP); NIPPON CRUCIBLE CO., LTD., Tokyo (JP)

( * ) Notice: Subject to any disclaimer, the term of this patent is extended or adjusted under 35 U.S.C. 154(b) by 79 days.

(21) Appl. No.: 15/761,574

(22) PCT Filed: Nov. 12, 2015

(86) PCT No.: PCT/TH2015/000079
§ 371 (c)(1),
(2) Date: Mar. 20, 2018

(87) PCT Pub. No.: WO2017/065701
PCT Pub. Date: Apr. 20, 2017

(65) Prior Publication Data
US 2019/0056177 A1 Feb. 21, 2019

(30) Foreign Application Priority Data
Oct. 13, 2015 (TH) ................. 1501006287

(51) Int. Cl.
*F27B 3/20* (2006.01)
*F27B 3/04* (2006.01)
(Continued)

(52) U.S. Cl.
CPC ............. *F27B 3/205* (2013.01); *C22B 7/003* (2013.01); *F27B 3/04* (2013.01); *F27B 3/12* (2013.01);
(Continued)

(58) Field of Classification Search
CPC .... C22B 7/003; F22B 3/04; F22B 3/12; F22B 3/20; F22B 3/205; F22B 3/22; F22B 3/28;
(Continued)

(56) References Cited

U.S. PATENT DOCUMENTS 6,549,558 B1 * 4/2003 Okada ................. C22B 9/16
373/77
7,060,220 B2 6/2006 Nakashima
(Continued)

FOREIGN PATENT DOCUMENTS

JP 49-143404 U 12/1974
JP 50-013848 Y 4/1975
(Continued)

OTHER PUBLICATIONS

Extended European Search Report for European Patent Application No. 15906330.4 dated Feb. 19, 2019 (9 pages).
(Continued)

*Primary Examiner* — Steven B McAllister
*Assistant Examiner* — Benjamin W Johnson
(74) *Attorney, Agent, or Firm* — Kratz, Quintos & Hanson, LLP

(57) ABSTRACT

A furnace as described in this invention comprises a temperature regulating portion to assist in melting a non-ferrous material, such as an aluminium, and to reserve said material for the subsequent casting or injection molding procedure. The furnace provides a mean to eliminate an oxide, such as iron oxide, which generally floats on the top layer of a molten material inside a melting portion and a heating portion by preventing the flow of said oxide into the temperature regulating portion. A sensor or any detector that can detect the level of the molten material is utilized to measure the surface level of said molten material. A temperature
(Continued)

regulating burner, which is a flat flame type, is utilized on the ceiling of the temperature regulating portion in order to prevent any oxidation reaction to occur as well as to reduce the concentration of oxygen inside the portion.

5 Claims, 8 Drawing Sheets

(51) Int. Cl.
```
F27B 3/12      (2006.01)
F27B 3/22      (2006.01)
F27B 3/28      (2006.01)
F27D 13/00     (2006.01)
F27D 17/00     (2006.01)
F27D 99/00     (2010.01)
F27D 21/00     (2006.01)
F27D 19/00     (2006.01)
C22B 7/00      (2006.01)
```
(52) U.S. Cl.
CPC ............... *F27B 3/20* (2013.01); *F27B 3/22* (2013.01); *F27B 3/28* (2013.01); *F27D 13/00* (2013.01); *F27D 17/004* (2013.01); *F27D 19/00* (2013.01); *F27D 21/00* (2013.01); *F27D 99/0033* (2013.01); *F27D 21/0028* (2013.01); *F27D 2019/0071* (2013.01)

(58) Field of Classification Search
CPC ........ F27D 13/00; F27D 17/004; F27D 19/00; F27D 21/00; F27D 21/0028; F27D 99/0033; F27D 2019/0071

USPC .......................................................... 432/36
See application file for complete search history.

(56) References Cited

U.S. PATENT DOCUMENTS

| 7,235,210 B2 | 6/2007 | Nakashima |
| 2001/0028136 A1 | 10/2001 | Hertwich |
| 2006/0027953 A1 | 2/2006 | Nakashima |
| 2015/0042024 A1 | 2/2015 | Nakashima |

FOREIGN PATENT DOCUMENTS

| JP | S54-048642 A | | 4/1979 |
| JP | 55-064098 U | | 5/1980 |
| JP | 59-009297 U | | 1/1984 |
| JP | S62-062184 A | | 3/1987 |
| JP | H03-061299 U | | 6/1991 |
| JP | H07-126770 A | | 5/1995 |
| JP | 08-157978 A | | 6/1996 |
| JP | 11-223463 A | | 8/1999 |
| JP | H 11223463 A | * | 8/1999 |
| JP | 2001-272171 A | | 10/2001 |
| JP | 2001-324271 A | | 11/2001 |
| JP | 2005-024212 A | | 1/2005 |
| JP | 2006-071266 A | | 3/2006 |
| JP | 2008-215628 A | | 9/2008 |

OTHER PUBLICATIONS

International Search Report for International Application No. PCT/TH2015/000079 dated May 10, 2016 (2 Sheets).

* cited by examiner

PRIOR ART

FURNACE

FIELD OF THE INVENTION

The field of the invention relates to mechanical engineering and material sciences, in particular, the invention relates to the components and structure of non-ferrous metal melting furnace.

BACKGROUND OF THE INVENTION

In general, there are three main types of metal furnace as follows. (1) direct fuel fire furnace—the furnace contains separate portions, zones or chambers for pre-heating a metal, for melting said metal, and for controlling temperature wherein the furnace utilizing the flame that is directly in contact with the metal inside the melting pot, and which is suitable for melting large number of metal; (2) indirect fuel fire furnace—the furnace having a cylindrical shape or pan shape which can be subdivided into a lift-out furnace, a tilting furnace, or a rotary crucible furnace; (3) electrical powered furnace—the furnace is subdivided into 2 types including those utilizing electrical resistance and electrical induction.

This invention can help solve the problem with the accumulation of metal oxides—such as aluminum oxides which are difficult to remove and clean up, and can have a negative effect on total yield of molten material production-inside the temperature regulating or holding portions for holding the molten metal inside the conventional direct fuel fire furnace.

A set of examples of the conventional furnace can be illustrated in FIGS. 5-8 herein a melting portion (6) is located under a pre-heating portion (5), and on one side of the furnace (6) contains a burner (9). Non-ferrous metal or aluminum can be transferred into the furnace through an opening (17) which is situated above the pre-heating portion (5) and is then heated with the burner (9) to liquefy the non-ferrous metal or aluminum into a molten material (1b). The molten material (1b) then flows over the tilted surface (15) and into the temperature regulating portion (3) wherein the temperature of said portion (3) is maintained or increased by a burner (12). The molten material (1b) shall then flow through a lower edge (13), which is an extension of a separator (10), and out of a furnace exit (4). The resulting molten material (1c) can then be used in the casting or molding process by an external casting or molding equipment. Non-ferrous material, such as aluminum, can be poured into the pre-heating portion (5) containing a lid (16) and wherein the melting portion (6) containing a door (23) attaching on one side. The door (23) can be opened for inspection and for cleaning the melting portion (6). The temperature regulating portion (3) contains a door (24) which can be opened for inspection and for cleaning of the temperature regulating portion (3).

The above components and structure of the conventional furnace have certain drawbacks since the molten material (1b) melted by a burner (9) can also flow into and mix with an oxide (21a) inside the temperature regulating portion (3) that is connected to the tilted surface (15). The molten material (1b) is then maintained at a defined temperature which is controlled by the burner (12) attaching to a ceiling lid (11). Since the molten material (1b) shall be kept under high temperature inside the temperature regulating portion (3), an oxidation reaction with the air inside the portion (3) can occur which can generate oxides (21b) that can form a cluster and grow in size inside the portion (3). Therefore, it is necessary for its users to constantly clean the temperature regulating portion (3) by opening the door (24). Nevertheless, as the cleaning process shall be conducted under high temperature, the total removal of oxides (21b) from the temperature regulating portion (3) is often a difficult and complicated task. In addition, the oxides (21b) that has not been removed and has been under high temperature for a long period of time may crystallize into corundum ($Al_2O_3$ or other forms of crystallized material, which are then intensely attached to the inner wall or surface of the furnace. The oxides (21b) as described is the root cause of the problems including, but not limited to, the shredding of said oxides (21b) from the inner furnace wall that falls into the molten material mixture, causing a hard spot in the casted or molded work and deteriorating the strength of the final product, accordingly. In addition, the oxides (21b) may grow on the inner wall of the temperature regulating portion (3), thereby, reducing the area inside the portion (3), altering or deteriorating an insulator (22) inside the temperature regulating portion (3), and subsequently, causing leakage of heat to the outside environment. To improve the quality of the product, it is therefore necessary that the furnace generates or emits the lowest amount of oxides (21b) during the production.

The problems caused by oxide accumulation as stated above had been anticipated by the U.S. Pat. No. 7,060,220 under the name "metal melting furnace" wherein the invention had intended to resolve the oxide accumulation issue by providing a separation wall between the inclined or tilted hearth linking from the melting portion to the temperature regulating portion. The separation wall creates a connecting passage that is in the level below the molten material inside the temperature regulating portion and the inclined hearth, and thereby, preventing metal oxides from flowing into the temperature regulating portion. However, said invention contains a molten metal processing portion which is less than half the size of the temperature regulating portion and has a floor level that is lower than said portion and the connecting passage which may increase complexity of the system due to the increase in number of furnace components. A Japanese patent JP2006071266 under the name "metal melting furnace" had also described a portion separator with additional heating plate within the melting portion. Reduction of oxide had also been anticipated by two other patent applications: one by a Japanese patent application JP2001272171A under the name "tower type aluminium melting and holding furnace" by increasing the temperature of melting portion and temperature regulating portion; another by a US patent application US20150042024 under the name "metal melting furnace" by utilizing a charging port, an upper air vent and a heating plate on the ground inside the melting portion, and a burner head is located on the side of the temperature regulating portion. The applications as suggest, however, had utilized a set of complex components which may not be suitable in some circumstances.

The above prior arts were intended to improve the components or structures of furnace or to provide the means to control the amount of gases or chemical processes in order to reduce the amount of iron oxide generation in the system. However, there is still lack of invention in the prior arts that has the capability to improve efficiency of the industrious, non-ferrous metal furnace, such as aluminium furnace, in eliminating oxide from furnace without introducing complex components such as heating plates, doors, or separators, in the furnace system.

SUMMARY OF THE INVENTION

A furnace according to this invention is characterized by a temperature regulating portion for melting a non-ferrous metal, such as aluminium, and for storing said molten material for the subsequent casting. This invention helps to reduce the amount of oxide generated inside the temperature regulating portion and, thus, to improve the quality of aluminium or non-ferrous metal. The invention provides the protection against oxide production that floats on the water surface. Molten material in the melting portion of the furnace shall sink below the bottom edge of a separation wall and flow through a connecting passage to the temperature regulating portion by utilizing a sensor or a molten material detecting device to control the surface level of molten material. The invention further utilizes a temperature regulating burner comprising a flame on one part of the ceiling of the temperature regulating portion so as to prevent a reaction between the molten aluminium and the gas inside the portion and to control and reduce the oxygen concentration inside the portion to prevent the possibility of oxide generation from the molten material.

DETAILED DESCRIPTION OF THE INVENTION

Figure 1:
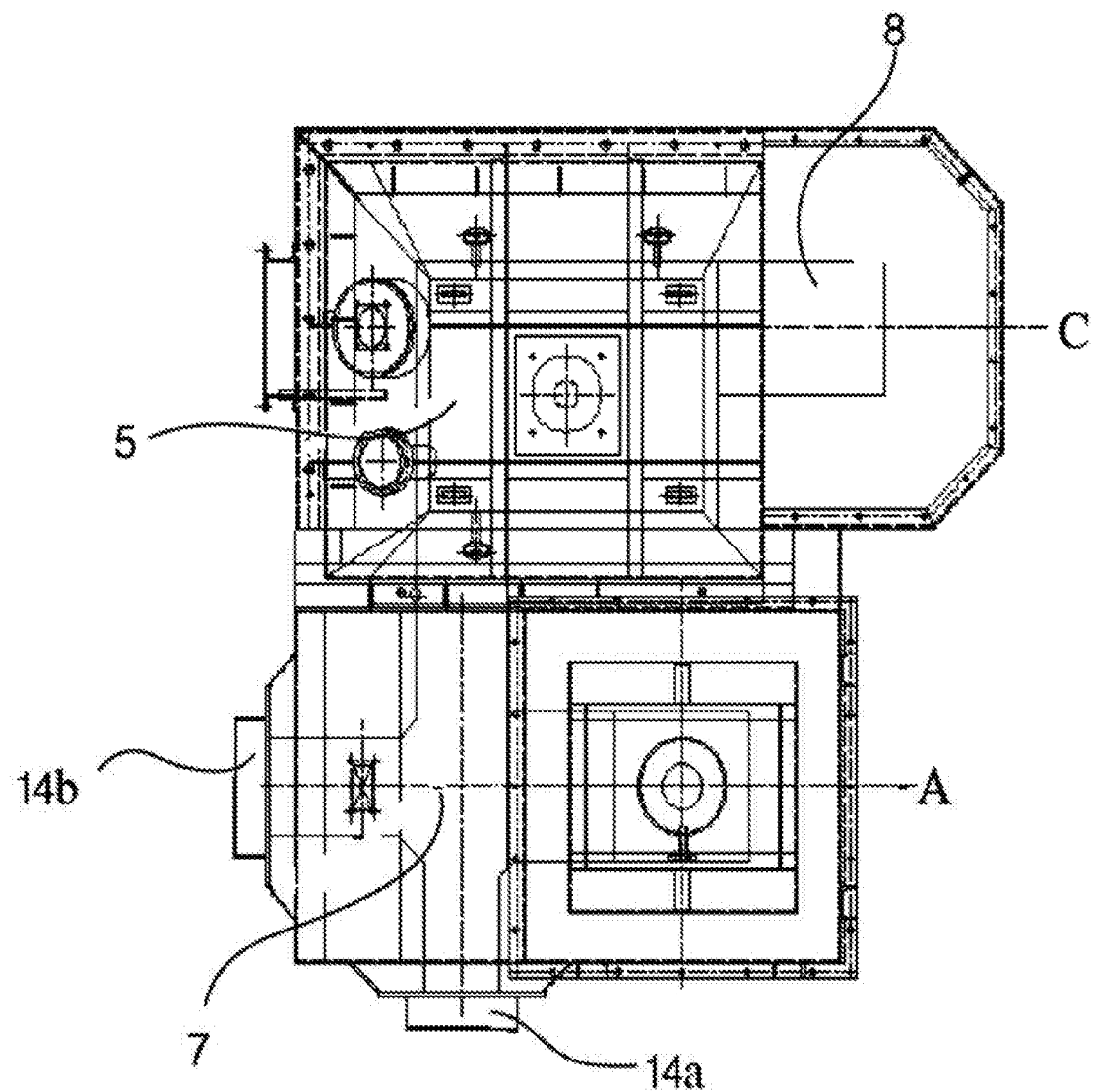
FIG. 1 is showing the top view of the furnace of this invention.
Figure 2:
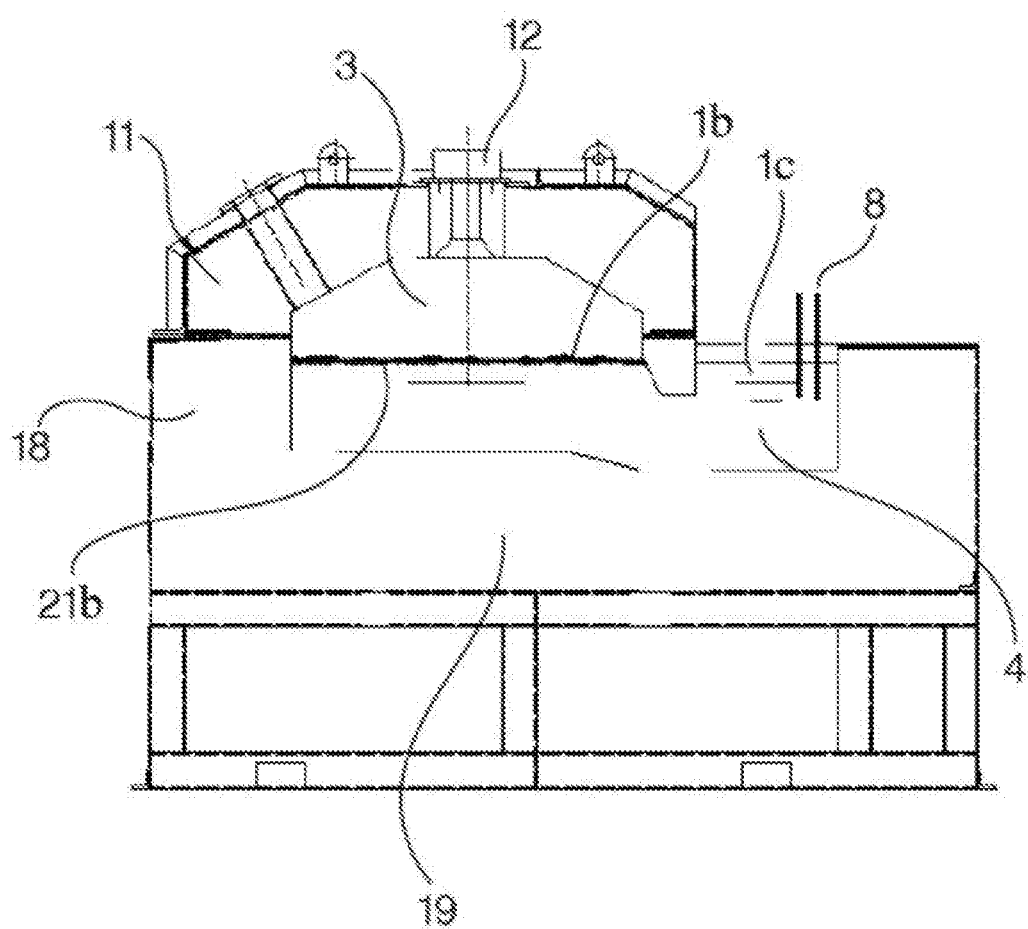
FIG. 2 is showing the cross-sectional side view C of the furnace of this invention.
Figure 3:
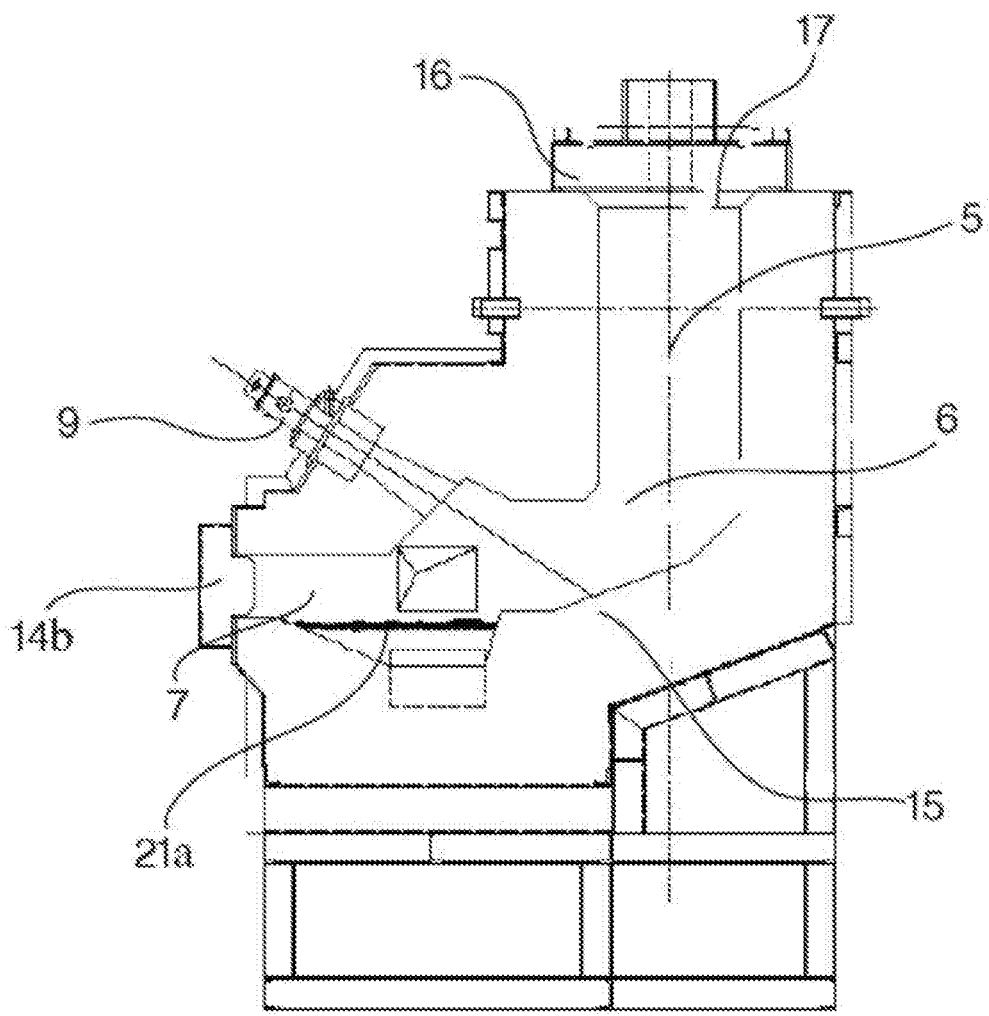
FIG. 3 is showing the cross-sectional side view A of the furnace of this invention.
Figure 4:
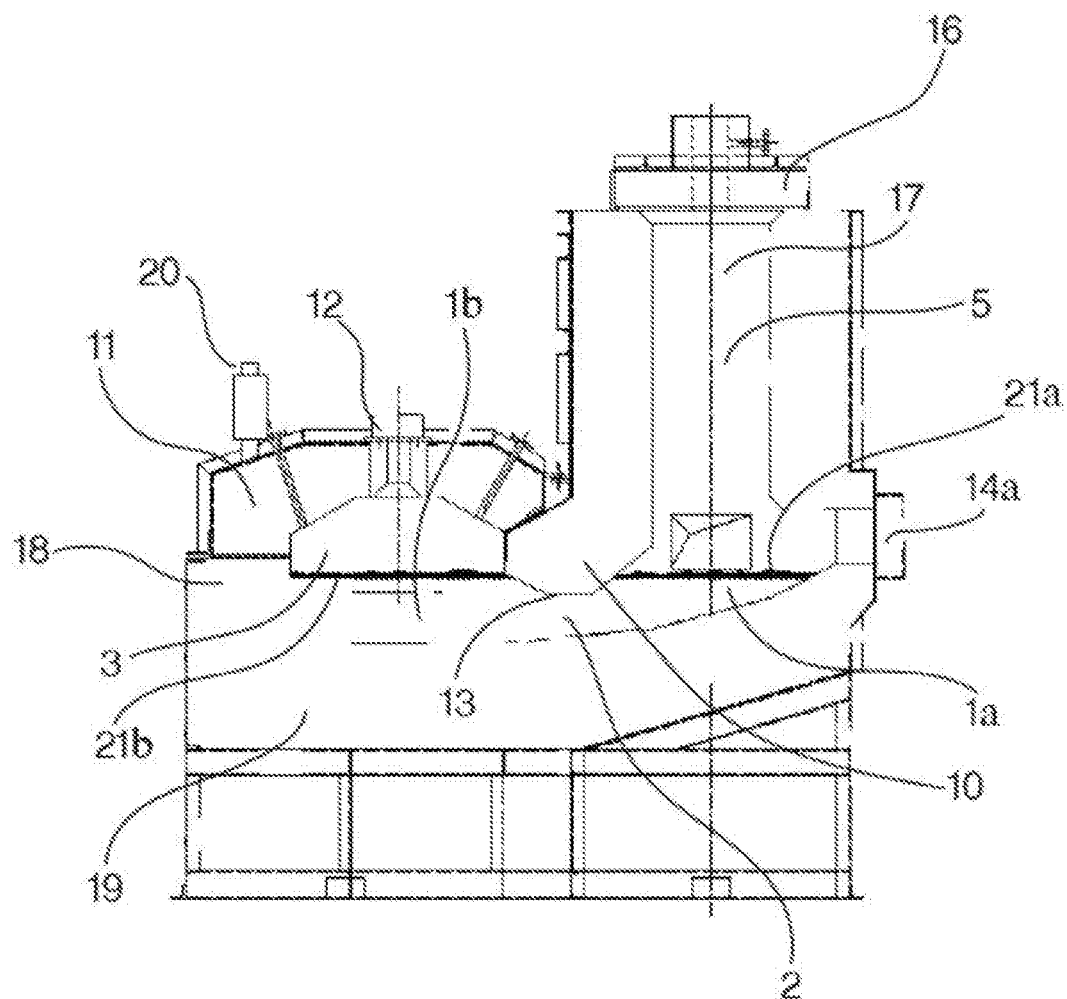
FIG. 4 is showing the cross-sectional side view B of the furnace of this invention.
Figure 5:
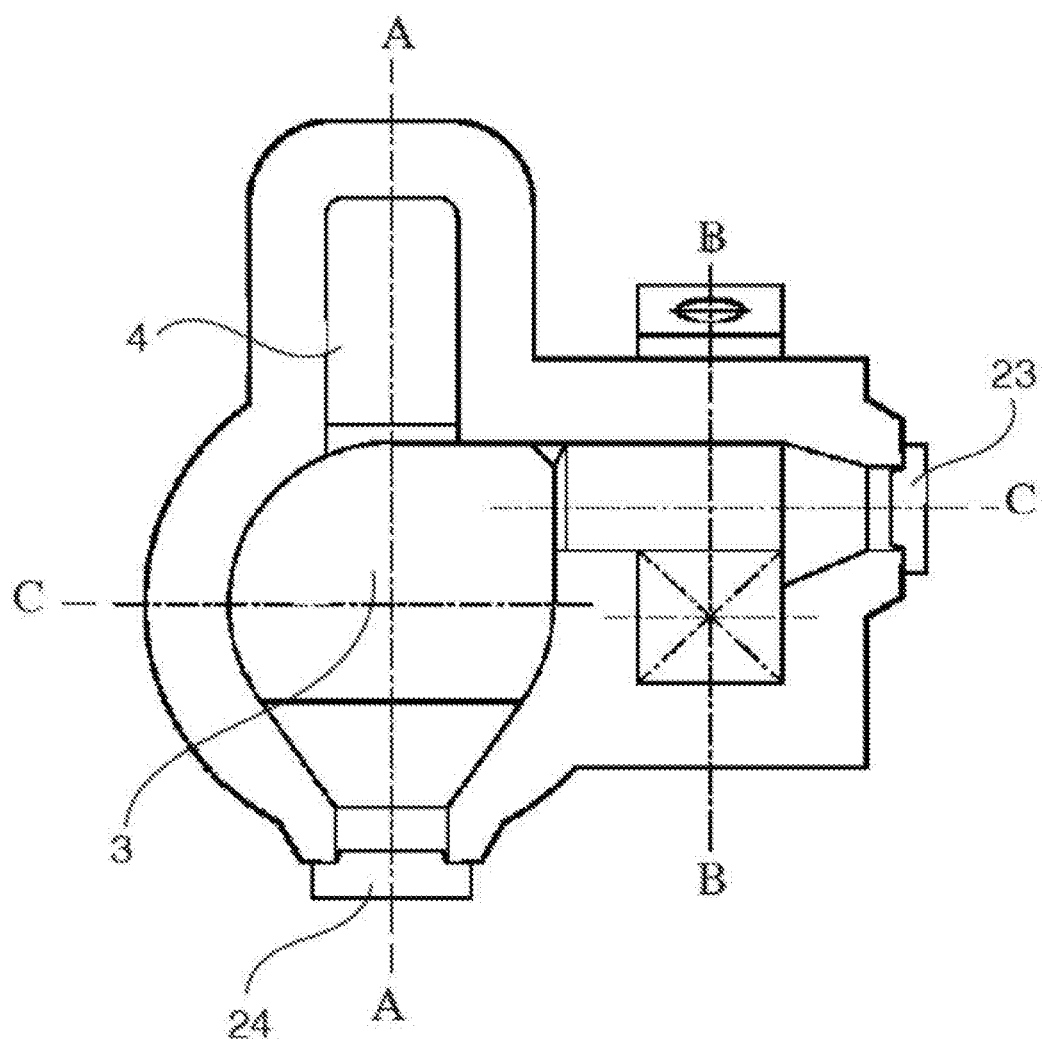
FIG. 5 is showing the top view of furnace in the prior arts.

FIG. 1 is showing one embodiment of the top view of the furnace according to this invention which comprises various components as illustrated in the cross-sectional view C of FIG. 2, the cross-sectional view A of FIG. 3, and the cross-sectional view B of FIG. 4. The furnace comprises a material insert channel (17) and a lid (16) wherein once the material is inserted inside the channel (17), it will be moved into a pre-heating portion (5). Below the pre-heating portion (5) is a melting portion (6) and an inclined hearth (15). The upper side of the inclined hearth (15) comprises a burner (9) wherein the material will be melted by heat of the flame of the burner (9) in the melting portion (6) before flowing downward on the inclined hearth (15) into a molten material heating portion (7). The heating portion (7) is used to maintain and to increase temperature of the molten material (1a) and the portion (7) comprises an oxide elimination door (14a) and (14b). The heating portion (7) further comprises a connecting passage (2) for a molten material (1a) to flow into a temperature regulating portion (3) which can hold a molten material (1b) before a molten material (1c) exits the furnace through an exit channel (4). The furnace according to this invention especially comprises the temperature regulating portion (3) wherein said portion (3) comprises the connecting passage (2) for holding the molten material (1a) and the exit channel (4) for discharging the molten material (1c). The connecting passage (2) further connects to the lower part of the pre-heating portion (5), the melting portion (6), the inclined hearth (15) and the heating portion (7).

The connecting passage (2) can protect the furnace against an oxide generation (21a) that generally floats on top of the molten material (1a) which moves from the melting portion (6) and the heating portion (7) into the temperature regulating portion (3) wherein the connecting passage (2) is located below a lower edge (13) of a separator (10) and then flows into the temperature regulation portion (3). The lower base of connecting passage (2) is characterized by an inclined surface that plunges below the position of the lower edge (13). A molten material detector or a sensor (8) is located in proximity to the exit channel (4) or on any part of the furnace wherein the detector (8) can effectively detect and maintain the top surface level and, thus, the height of the molten material (1a), (1b), (1c) above the lower edge (13) of the separator (10) without pumping or discharging the material (1c) from the exit channel (4) so that the oxide (21a) from the heating portion (7) will not be mixed with the molten material (1b) within the temperature regulating portion (3).

Inside the temperature regulating portion (3) comprises a heat exchanger (20) to adjust temperature of the air used in the combustion or at least one hole in the lower edge (13) between the heating portion (7) and the temperature regulation portion (3) or at least one hole and one heat exchanger (20) that may have an effect on the reduction in the energy used in the combustion. Further a temperature regulating burner (12) is located on a ceiling lid (11) of the portion (3) wherein the burner (12) preferably emits a band of flat flame on the ceiling. The flat flame of the burner (12) can also control the oxygen concentration to 1-5%, more preferably less than 1%, of the total combustible gas inside the temperature regulating portion (3) to reduce the thickness of the oxide on the top layer of the molten material (1b).

Figure 6:
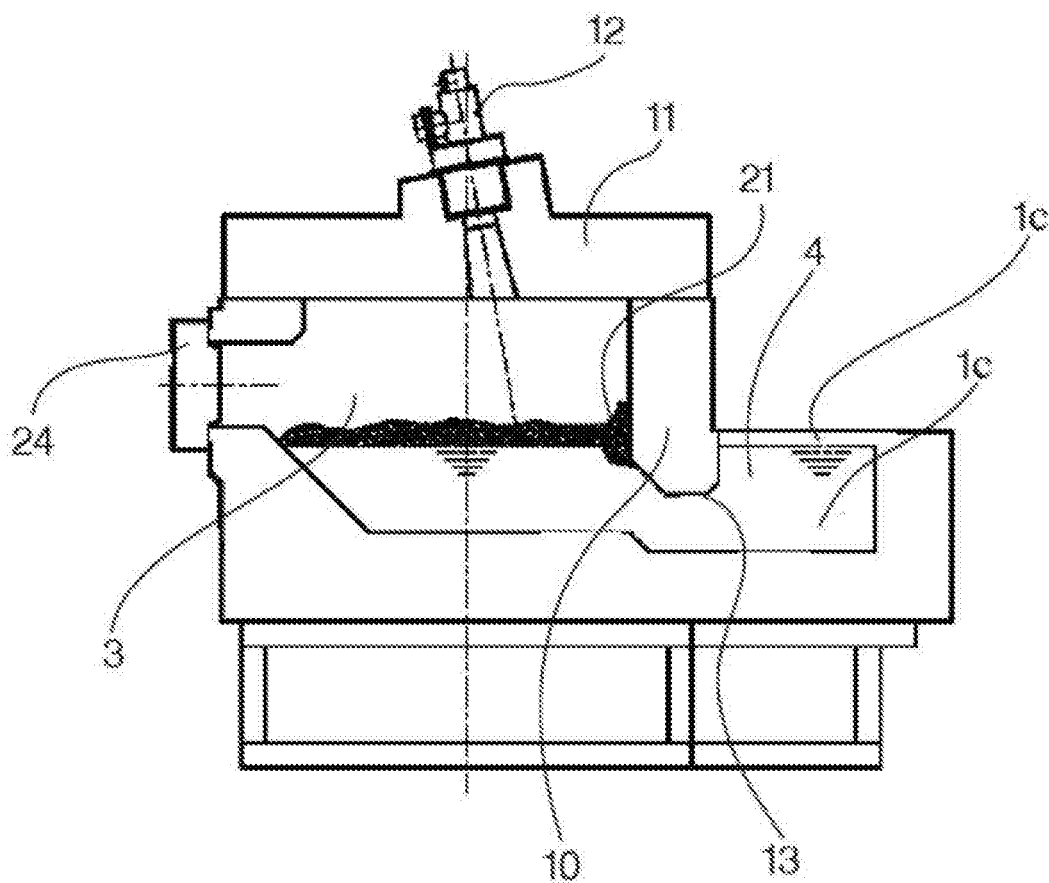
FIG. 6 is showing the cross-sectional side view A of furnace in the prior arts.
Figure 7:
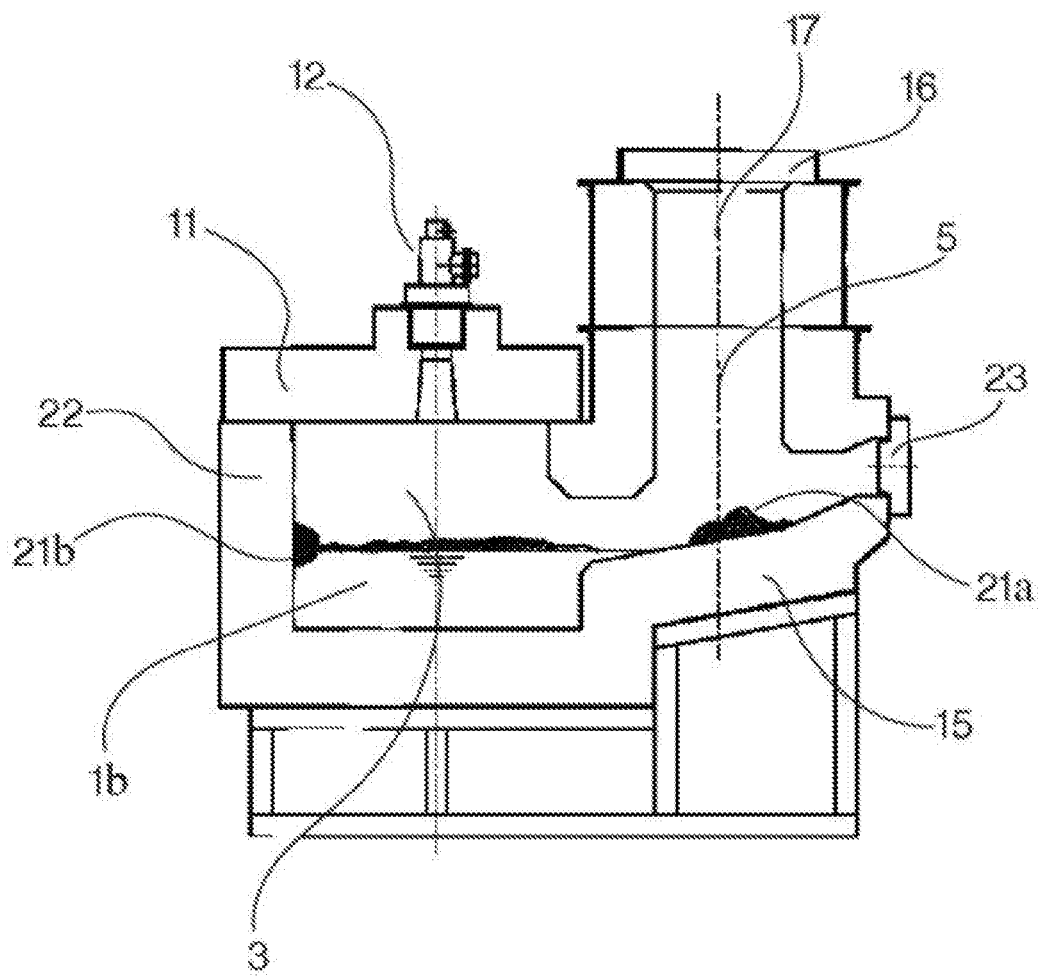
FIG. 7 is showing the cross-sectional side view C of furnace in the prior arts.
Figure 8:
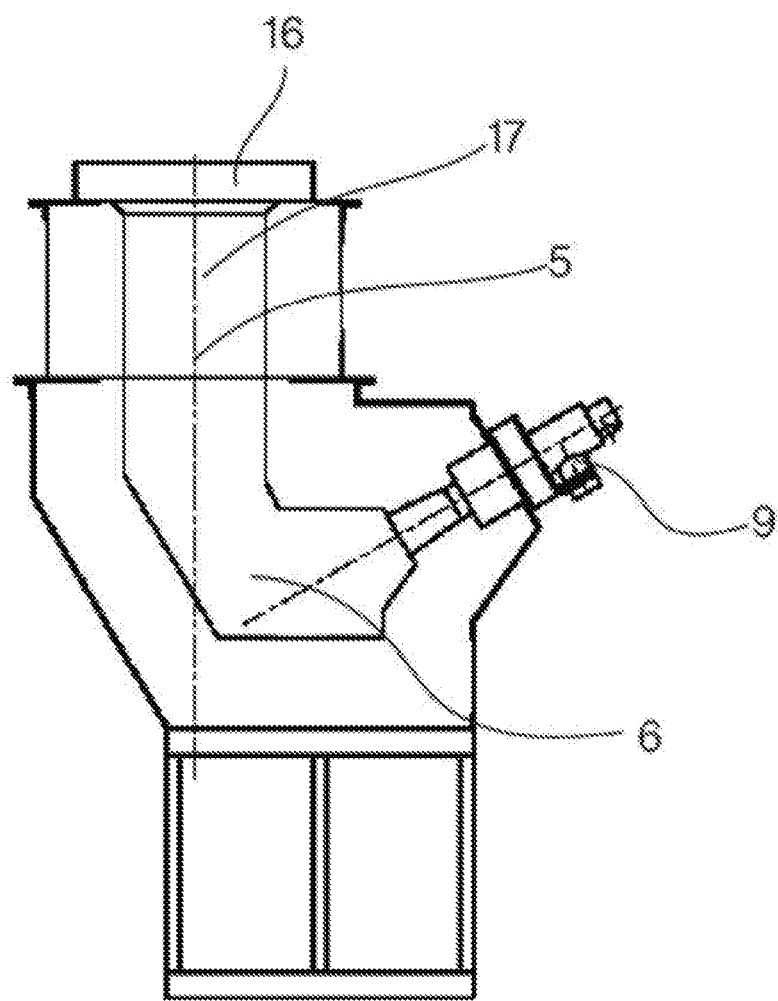
FIG. 8 is showing the cross-sectional side view B of furnace in the prior arts.

Unlike the conventional temperature regulating portion (3) which needed to be cleaned up regularly and, thereby, required a temperature regulating door (24) as illustrated in FIG. 6 to eliminate the metal oxide from the furnace, this invention does not require an installation of temperature regulating door (24), but rather utilizes a temperature regulating burner (12) with flat flame which can control the amount of oxygen inside the temperature regulating portion (3) of the furnace and which further comprises the detector or sensor to measure the amount of oxygen inside the temperature regulating portion (3) to reduce the amount of oxide produced. Such configuration as described can also reduce the weight of oxide in the furnace and, at the same time, reduce energy consumption and manpower to clean-up the furnace.

The above process is only one of the variations of this invention and is, by no means, limited to the description as stated above. One can improve upon or modify the components if they are in line with the intention of this invention, such as by having the burner (12) located on the ground surface (19) of the temperature regulating portion (3) or by having an immersion heater or heating tube which is induced by electricity or fuel gas or by having a metal-based heater or burner on the ceiling lid (11) or by having a fiber or porous material based heater or burner which can provide a structure that enables the air to flow through the surface structure.

In an instance of utilizing the immersion heating tube or metal-based heater in the ceiling lid (11) inside the temperature regulating portion (3), to prevent or stop the molten material (1b) from quickly undergoing oxidation reaction, it may be necessary to inject an inert gas to reduce the oxygen concentration inside the temperature regulating portion (3).

The invention claimed is:

1. A furnace wherein the furnace comprises the following components:
   a furnace wall;
   a pre-heating portion comprising a lid with a material insert channel;
   a melting portion and an inclined hearth below the pre-heating portion;
   a first burner above the inclined hearth;
   a heating portion comprising an oxide-eliminating door and a connecting passage, wherein the heating portion is configured to hold a molten material that has been melted by the first burner in the melting portion and that has flowed over the inclined hearth;
   a temperature regulating portion for storing the molten material, the temperature regulating portion comprising a temperature regulating burner which emits a flame, wherein the connecting passage has an inclined or curved bottom and wherein the connecting passage allows molten material to flow from the heating portion into the temperature regulating portion;
   a separator for forming the connecting passage wherein the separator comprises a lower edge that is located below a liquid surface of the molten material inside the heating portion and a liquid surface of the molten material inside the temperature regulating portion, when there is molten material in the furnace; and
   an exit channel for the molten material,
   wherein the temperature regulating portion is a closed system, and wherein the temperature regulating burner is configured to control the oxygen concentration in the temperature regulating portion to 0-5%.

2. The furnace according to claim 1, further comprising a sensor for detecting the level of molten material, wherein the sensor is located in the exit channel.

3. The furnace according to claim 1, wherein the temperature regulating burner is a flat flame burner.

4. The furnace according to claim 1 wherein the temperature regulating portion further comprises:
   a heat exchanger on one part of the furnace wall or on a ceiling lid.

5. The furnace according to claim 1 wherein the temperature regulating portion is a closed system without a door.

* * * * *